United States Patent [19]

Picek

[11] 4,369,110
[45] Jan. 18, 1983

[54] OIL FILTER FOR USE ON INTERNAL COMBUSTION ENGINES

[75] Inventor: Robert A. Picek, Noble, Okla.

[73] Assignees: David L. Priest, Norman; Harold L. Priest, Moore; Michael G. Priest, Noble; Bessie A. Rainer, Norman, all of Okla.

[21] Appl. No.: 292,711

[22] Filed: Aug. 13, 1981

[51] Int. Cl.³ .............................................. B01D 35/18
[52] U.S. Cl. .................................... 210/180; 210/184; 210/238; 210/436; 123/196 A; 196/46.1
[58] Field of Search ............... 210/168, 180, 184, 185, 210/416.5, 436, 232, 238; 196/46.1, 115; 123/196 A

[56] References Cited

U.S. PATENT DOCUMENTS

| | | | |
|---|---|---|---|
| 2,839,196 | 6/1958 | Schwalge | 210/180 |
| 4,017,397 | 4/1977 | Copeland | 210/238 |
| 4,093,548 | 6/1978 | Sterkenburg | 210/180 |
| 4,146,475 | 3/1979 | Forsland | 210/180 |

*Primary Examiner*—Ernest G. Therkorn
*Attorney, Agent, or Firm*—Head, Johnson & Stevenson

[57] ABSTRACT

An oil filter for use on internal combustion engines, the filter having a body portion with an interior recess opening therein and with a threaded opening at the recessed end to receive the attachment of a filter cartridge, the body having an oil inlet, an oil outlet and a vent opening, a needle member extending from the body portion centrally of the end adapted to receive the attachment of a filter cartridge, the needle portion being connected with the oil inlet, the filter cartridge having packing material therein, the cartridge being threadably secured to the body so that the needle extends through the packing and, when the filter cartridge is in place, the end of needle is adjacent the cartridge interior bottom, oil passing into the filter flowing through the needle and being discharged within the cartridge and flowing through the packing material and into the body opening and out through the oil outlet, the space between the filter cartridge and the body interior being separated by a plate having steps or ledges with an opening so that oil flowing through the filter material in the cartridge flows through the openings and down over the steps and ledges affording opportunity for the escape of volatile components, any solid contaminants in the oil being captured by the packing in the filter cartridge.

8 Claims, 4 Drawing Figures

OIL FILTER FOR USE ON INTERNAL COMBUSTION ENGINES

BACKGROUND OF THE INVENTION

1. Field of the Invention

This disclosure relates to oil filter and reconditioning devices as used on internal combustion engines and to an improved device including means of mounting a filter cartridge to a permanently mountable body portion and including means so that the filter may be mounted either vertically or horizontally while permitting the escape of volatile components from the oil as it passes through the filter.

2. Description of the Prior Art

The use of oil reconditioning devices, which are also referred to as oil filters, oil refiners, and oil reclaimers, is well known. Examples of prior art devices for use in filtering, reconditioning, and reclaiming oil include the following U.S. Pat. Nos.:

2,088,243
2,173,631
2,428,939
2,839,196
3,616,885
3,915,860
4,006,084

These devices show arrangements for improving the quality of oil, particularly as employed in internal combustion engines. It is well known that oil quality deteriorates as it is used in engines for two primary reasons. First, solid components become entrained in the oil, such as solid particles of carbon resulting from the oxidation of oil components, metal worn away as a result of engine wear, etc. The second main cause of deterioration of lubricating oil in engines is the accumulation of volatile components. These are primarily due to two sources. One is by unburned fuel entering the lubricating oil and the second is water which is condensed in the engine each time the engine cools.

Most oil reclaimers or refiners of the known art such as exemplified in the above-listed patents accomplish the improvement of oil flowing through the devices by extracting solid components by means of filtration and by providing means for the removal of entrained volatile components, including water, lighter hydrocarbons, etc. These devices function satisfactorily; however, most of the known devices include containers in which the packing or filter material is retained. In order to replace the packing it must be removed from the containers and new packing inserted. Removing old packing is a disagreeable process. The present invention is directed towards improvements in oil refining and reclaiming devices in which the filter media is retained in a disposable cartridge and in which an improved means is provided for causing circulating of oil through the cartridge.

The known prior art oil reclaiming and reconditioning devices are typically arranged so that they function only in the vertical orientation. In some instances space limitations make such mounting inconvenient. The present invention provides an oil reconditioning device which may be mounted either vertically or horizontally.

These advantages and improvements, along with others, will be better understood with reference to the following description and claims taken in conjunction with the attached drawings.

SUMMARY OF THE INVENTION

An improved oil reconditioning device for use on internal combustion engines is provided. The device includes a body portion which may be permanently affixed to the engine or to the frame of the vehicle if the engine is used in a vehicle. The body portion is preferably cylindrical and has means at one end to receive the attachment of a filter cartridge. The body portion has an oil inlet, oil outlet, and a vent opening. An interior recess is provided which communicates with the end which receives the filter cartridge. A needle member extends from the body portion centrally of the end receiving the attachment of the filter cartridge, the needle member being in communication with the oil inlet so that oil flowing into the body flows through the needle member. A disposable filter cartridge filled with packing is employed having a top end and closed bottom end. The cartridge is secured to the body portion by the extension of the needle member through the packing so that the outer end of the needle is adjacent to the cartridge interior bottom. In the preferred arrangement the body portion has a central pipe member through which the oil flows and which receives the inner end of the needle member, the cartridge being secured to the body portion by threading onto the central pipe member. Also in the preferred arrangement a stepped plate is positioned between the cartridge and the interior recess formed in the body portion so that oil flowing through the needle flows through the packing and then through small openings formed in the stepped plate. The oil flows over the steps and accumulates within the recess to flow outwardly through the oil outlet. A heating element is positioned in the housing to heat the interior of the housing to augment the removal of volatile components from oil flowing through the filter over the stepped plate. The vent opening permits the volatile components to pass from the interior of the body and thus be withdrawn from the oil passing through the reconditioning device.

DESCRIPTION OF THE VIEWS

DESCRIPTION OF THE PREFERRED EMBODIMENTS

Figure 1:
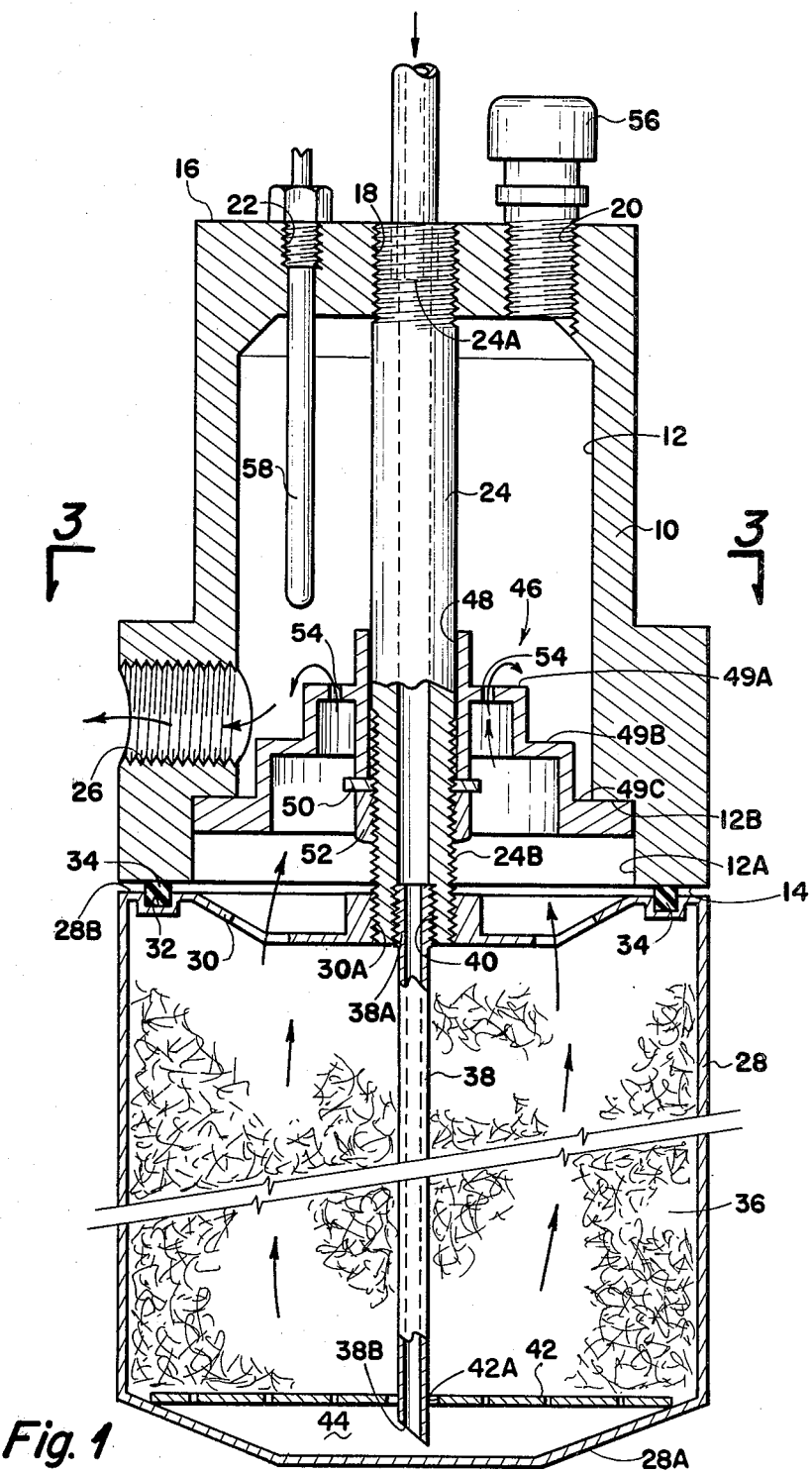
FIG. 1 is an elevational, cross-sectional view of a device employing the principle of this invention, the device being shown for vertical orientation.
Figure 3:
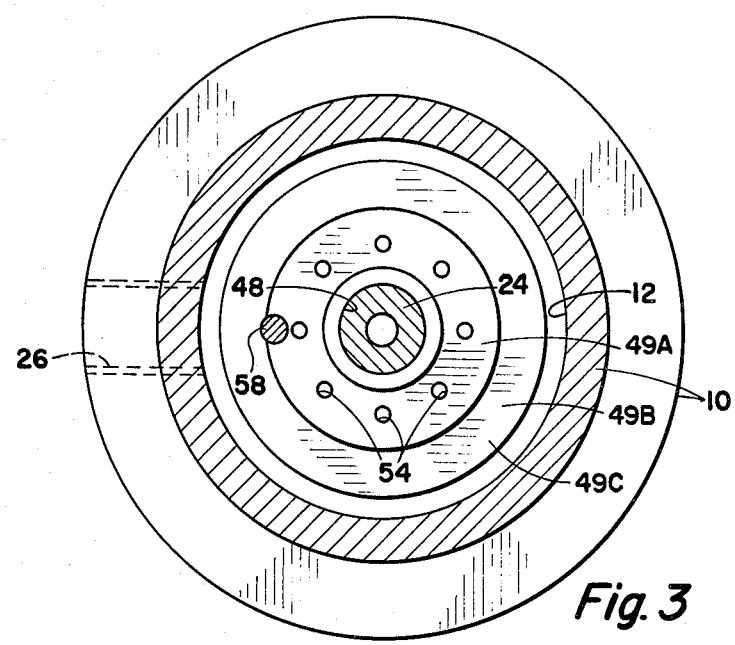
FIG. 3 is a cross-sectional view taken along the line 3—3 of FIG. 1 showing more details of the arrangement of the stepped plate as employed in the invention.

Referring to the drawings and first to FIGS. 1 and 3, an embodiment of the invention in which the oil reconditioner is vertically mounted is illustrated. The device is formed of a body portion 10 which is adapted to be permanently mounted to an internal combustion engine or to the frame of a vehicle or to other supporting structure if the internal combustion engine is stationary. The body 10 is illustrated as being cylindrical, a preferred arrangement although obviously it may be made of other shapes. The body 10 has an interior opening or recess 12, the opening communicating with the body first end 14. The opposite end 16 of the body has an oil inlet opening 18, a vent opening 20, and a heater opening 22, all the openings being internally threaded. The oil inlet opening 18 is coaxial with the body 10 when the body is cylindrical and receives a coaxial pipe 24. The first end 24A of the pipe is threaded and positioned in oil inlet opening 18. The other end of the pipe is threaded at 24B. The body portion 10 has an oil or drain outlet 26 in the cylindrical side and adjacent body end 14.

Secured to the body portion at end 14 is a filter cartridge 28 having a closed bottom end 28A. The opposite end 28B of the filter cartridge sealably engages the end of the body portion. For this purpose, the filter cartridge 28 has a perforated web 30 at the second end 28B. The web 30 has a central internal threaded opening 30A which is screwed onto the pipe end 24B. The web 30 also has a circumferential recess 32 around and adjacent the filter cartridge periphery. Recess 32 receives a gasket 34 which serves to maintain a leakproof seal between the interior of cartridge 28 and body recess 12. It can be seen that the filter cartridge may be readily attached to or removed from the body portion 10 by rotating it to thread the web recess 30A onto or off of pipe 24.

The interior of cartridge 28 is filled with a packing 36 which functions as a filter media. The packing 36 may be of a variety of materials which are employed for oil filtering purposes. A good material which is readily available is packing formed of cotton; however, the use of other natural and synthetic filter media is well known.

Extending from the pipe end 24B is a needle member 38. This may be accomplished such as by providing an internal threaded recess 40 in the end 24B of the pipe, the recess receiving the externally threaded portion 38A of needle 38. The needle provides a passageway so oil flowing into the interior of pipe 24 flows through the needle 38 and out the needle outer end 38B.

The preferred construction of the filter cartridge 28 is, as illustrated, wherein the bottom 28A is concave looking at it from the interior of the cartridge or convex looking at the cartridge exterior end. Positioned within the cartridge in contact with the interior circumferential portion of the body 28A is a perforated plate 42 having an opening 42A in the center. Plate 42 extends across the interior bottom of the filter cartridge 28 providing a space 44 which does not have packing in it. Oil flowing into space 44 from needle outer end 38B is distributed within the space and flows upwardly through the perforations in plate 42 into the packing 36 as illustrated by the arrows.

It can be seen that the employment of the needle member 38 provides an easy manner for the attachment of a filter cartridge onto the body portion 10. In addition, the manufacture of the filter cartridge 28 is greatly simplified. It does not require any type of central tube. The bottom plate 42 is installed and filter cartridge filled with packing 36, after which the web portion 30 is affixed circumferentially around the top of the cartridge completing the assembly. Since the cartridge employs a minimum number of components, it can be manufactured less expensively than other types of cartridges which include integral flow passageways to conduct oil into the lower portion of the filter to ensure its passage through the filter media.

The body recess 12 includes an enlarged internal diameter portion 12A thus forming an internal circumferential step or shoulder 12B within the body. Positioned within the recess 12 and in engagement with the shoulder 12B is a stepped plate member generally indicated by the numeral 46. The plate has an central opening 48 which receives pipe 24. By means of a washer 50 and nut 52, the stepped plate 46 is held in position on pipe 24 and in engagement with the circumferential shoulder 12B.

Plate 46 is configured to provide a plurality of circumferential ledges or steps 49A, 49B, 49C and 49D in the upper surface. Formed in the plate 46 in the uppermost step 49A is a plurality of small diameter openings 54. Oil passing through the packing and into the lower portion of the body recess 12 passes upwardly through the small diameter openings 54 into the upper portion of the recess 12. The oil flowing through the openings 54 flows down over each of the steps 49A-49D; the steps getting progressively larger in diameter and lower in elevation. This provides a large area over which oil flows from the small diameter openings 54 before the oil collects and flows out of the reclaimer through oil outlet 26. The provision of the stepped plate 46 provides a large surface area over which a relatively thin film of oil is formed so that volatile components freely escape from the oil stream. The released volatile components pass out through vent openings 20 in the upper end of the body. Vent 20 may be connected back to the engine intake manifold whereby vacuum is applied to the body interior 12 or the vent may communicate directly into the atmosphere through a vent fitting 56.

To augment the separation of volatile components from the oil as it flows through the reclaimer and to prevent condensation within the reclaimer, an electric heating element 58 is positioned in heater opening 22. The heating element 58 is connected to a voltage source, such as the vehicle battery, so that it is heated and thereby heats the interior of the body portion. The shape of the heater 58 is shown as being cylindrical, but the shape may vary considerably. It can be a typical U-shaped heater element. The shape of the heater element is immaterial. All that is required is that an electrically heated member be employed to heat recess 12 in body 10 to prevent condensation and to assist in driving off volatile components.

The reconditioner of FIGS. 1 and 3 provides means of filtering oil to remove solid components by means of packing 36 and provides means of removing volatile components in the interior recess 12 so that the oil flowing through the reconditioner is substantially improved in quality. In the typical installation the oil reconditioning device illustrate is positioned in series with an oil pump so that oil from the engine crankcase is continually cycled through the device. In this way the crankcase oil is cosntantly being reconditioned by removal of solid and low volatility contaminants.

Figure 2:
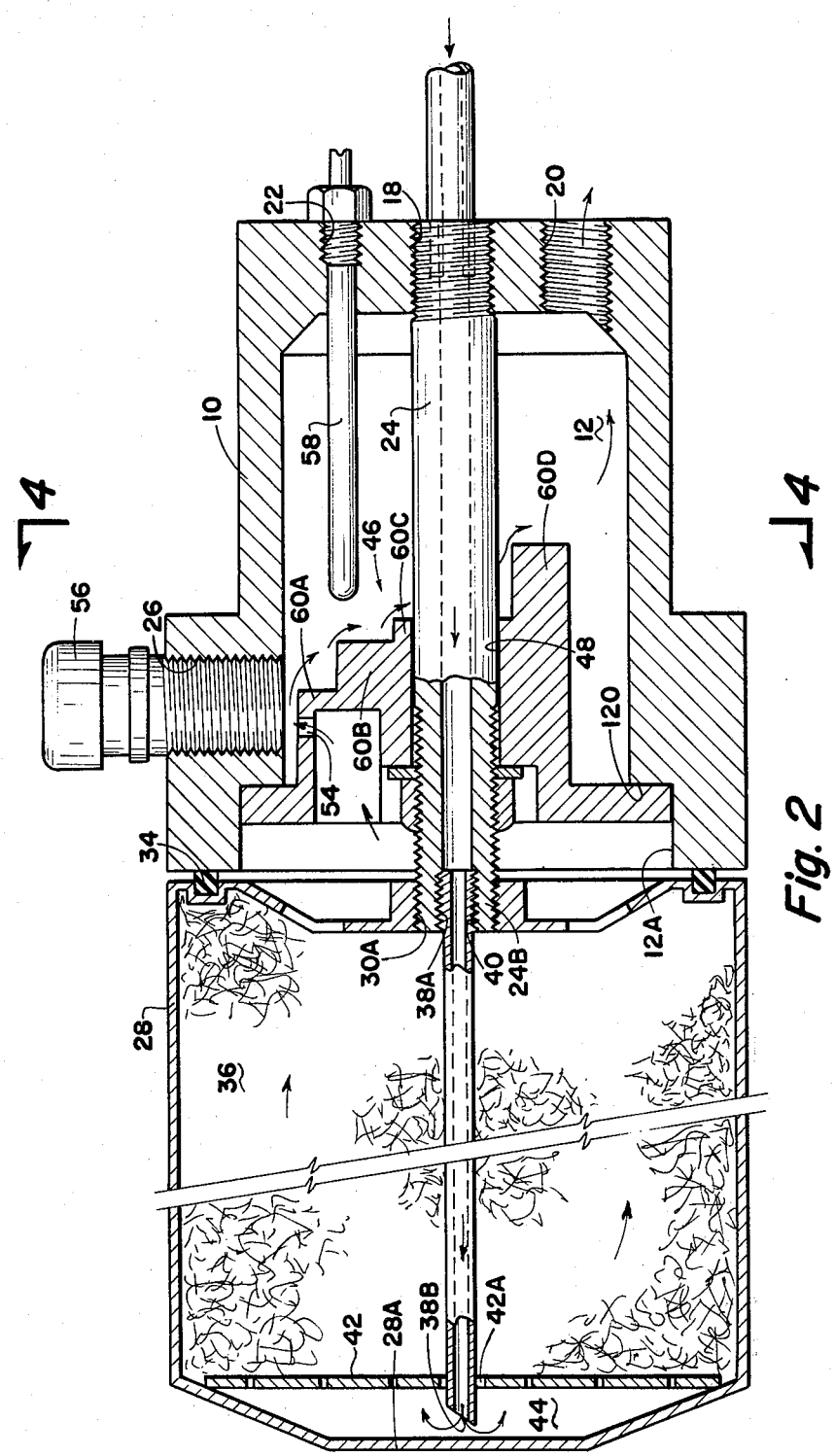
FIG. 2 is a cross-sectional view showing the embodiment of this invention arranged for horizontal orientation.
Figure 4:
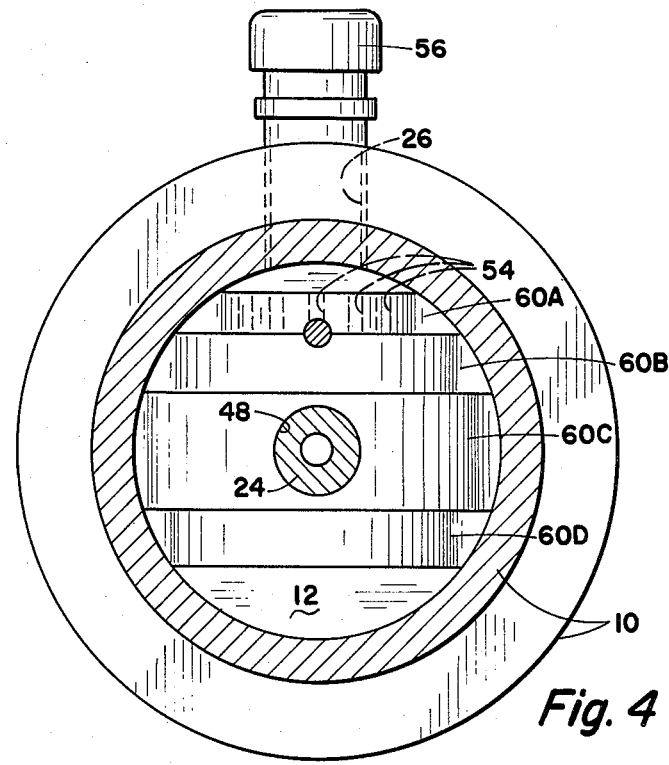
FIG. 4 is a cross-sectional view as taken along the line 4—4 of FIG. 2 showing an end view of the stepped plate as employed in the horizontally mounted arrangement of the invention.

Referring to FIGS. 2 and 4, an alternate arrangement of the invention is shown. The body portion 10 and filter cartridge 28 are identical to that illustrated in FIGS. 1 and 3. There are two differences between the embodiment of FIG. 2 and that of FIG. 1. First, the threaded inlet 20 of FIG. 2 functions as the oil outlet or drain and the threaded opening 26 functions as the vent opening and may be connected to the engine vacuum or may employ, as illustrated, a vent cap 56 for the same purpose as in FIG. 1. The other difference in the embodiments of FIGS. 2 and 4 is in the configuration of the stepped plate 46. This plate is provided with a plurality of horizontal shelves 60A, 60B, 60C, and 60D. The horizontal shelves are of increasing dimension and lower elevation. A plurality of openings 54 are provided in plate 46 arranged in the uppermost step 60A. Oil flowing from filter cartridge 28 flows through the openings 54 and down over the plurality of horizontal steps 60A-60D until it flows out opening 20. Thus the stepped plate of FIG. 2 performs the same function as that of FIG. 1 except for the arrangement of the steps to accommodate the horizontal position of the reconditioner body 10.

The invention described fulfills all the objectives initially set forth. A reconditioner is provided which can be vertically or horizontally mounted. It includes a means of employing a removable cartridge filter which can be inexpensively constructed in that the filter does not require an integral means of conveying oil to be recirculated into the bottom of the filter since such means is provided by a needle member which remains permanently with body portion 10. While the apparatus of the invention accomplishes the same purpose of the known type oil reconditioning devices, it has improvements in that it provides a disposable filter cartridge which is much more expeditiously replaced and in which the filter may be readily mounted either in the vertical or horizontal position.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. An improved oil reconditioning device for use on internal combustion engines, comprising:
   a body having an interior recess having means at one end to receive the attachment of a filter cartridge thereto, the body having an oil inlet and an oil outlet therein;
   a needle member extending from said body portion centrally of said one end, the needle member being in communication with said oil inlet;
   a filter cartridge having an open top end and a closed bottom end and having packing material homogeneously distributed across the full cross-sectional interior thereof, the cartridge being secured to said body so that the open top end is in sealed engagement with said one end of said body;
   means of removably attaching said filter cartridge to said body, the needle member extending through and penetrating said packing as the cartridge is attached so that the outer end of the needle member is adjacent the cartridge interior bottom, the outer cylindrical surface of said needle member sealably engaging said packing material, whereby oil flows into said body oil inlet, through said needle member and into said cartridge adjacent the interior bottom thereof, through said packing and back into said body interior opening and out through said body oil outlet, solid contaminants being captured by said packing material.

2. An improved oil filter for use in an internal combustion engine according to claim 1 including:
   a stepped plate received in said body recess separating the recess from said filter cartridge, the plate having a plurality of small diameter openings through which oil flows from said cartridge into the body recess.

3. An improved oil filter for use on an internal combustion engine according to claim 1 including:
   an electric heating element in said body recess.

4. An improved oil filter for use on an internal combustion engine according to claim 1 wherein said body oil inlet opening is threaded, wherein said stepped plate has a central opening therethrough, and wherein said filter cartridge has a central internally threaded opening in the top end, including:
   a pipe threaded at each end, the first end being received in said body oil inlet to receive the inlet flow of oil therethrough, the stepped plate being received on the pipe and the filter cartridge being threaded onto the pipe second end whereby the filter cartridge is held in sealed engagement with the body, and a nut received on the pipe between the filter cartridge and the stepped plate whereby the stepped plate is held in secure engagement with the body, said needle member extending co-axially from the pipe second end.

5. An improved oil filter for use on an internal combustion engine according to claim 1 including a bottom plate positioned in said filter cartridge adjacent the interior bottom and providing a space between the plate and the cartridge bottom, the plate having a central opening therein to receive the outer end of said needle member, said packing being between said plate and the cartridge top end, the space between the plate and the cartridge bottom end being free of packing providing an oil flow passageway.

6. An improved oil filter for use on an internal combustion engine according to claim 1 wherein the filter is oriented to operate in a vertical position with said body on top and said filter cartridge on bottom and wherein said stepped plate is configured to provide a plurality of coaxial steps of increasing diameter and lower elevation, said openings in the plate being spaced around an upper step.

7. An improved oil filter for use in an internal combustion engine according to claim 1 wherein the filter is oriented to operate in a horizontal position with said filter cartridge extending horizontally from said body and wherein said stepped plate is configured to provide a plurality of horizontally extending shelves, each lower shelf extending forwardly into said body portion interior opening, said openings in the plate being in an upper shelf.

8. An improved oil reconditioning device according to claim 1 wherein said body has a vent opening therein whereby volatile components released by the oil while in said body passes out through said vent.

* * * * *